C. B. WESTON.
STEAM SHOVEL AND THE LIKE.
APPLICATION FILED DEC. 11, 1916.

1,258,285.

Patented Mar. 5, 1918.

Inventor
Clarence B. Weston

By

Attorney

UNITED STATES PATENT OFFICE.

CLARENCE B. WESTON, OF MARION, OHIO, ASSIGNOR TO BALL ENGINE COMPANY, OF ERIE, PENNSYLVANIA, A CORPORATION OF PENNSYLVANIA.

STEAM-SHOVEL AND THE LIKE.

1,258,285.     Specification of Letters Patent.     Patented Mar. 5, 1918.

Application filed December 11, 1916. Serial No. 136,184.

*To all whom it may concern:*

Be it known that I, CLARENCE B. WESTON, a citizen of the United States, residing at Marion, in the county of Marion and State of Ohio, have invented new and useful Improvements in Steam-Shovels and the like, of which the following is a specification.

This invention relates to steam shovels and the like and consists in certain improvements in the construction thereof as will be hereinafter fully described and pointed out in the claims.

Machines of this type are provided with a frame on which is mounted a swinging platform. The power mechanism of the machine is mounted on this swinging platform. In moving the machine from one place to another it is operated through its traction. The hoisting engine which is used in the normal operation of the machine for hoisting the shovel or clam shell, as the case may be, is utilized for driving the machine. It is desirable to have the machine driven at different speeds. Different methods have been employed for affording differences in gear ratio to accomplish this purpose. The object of the present invention is to simplify this mechanism.

The invention is illustrated in the accompanying drawings as follows:—

Figure 1:
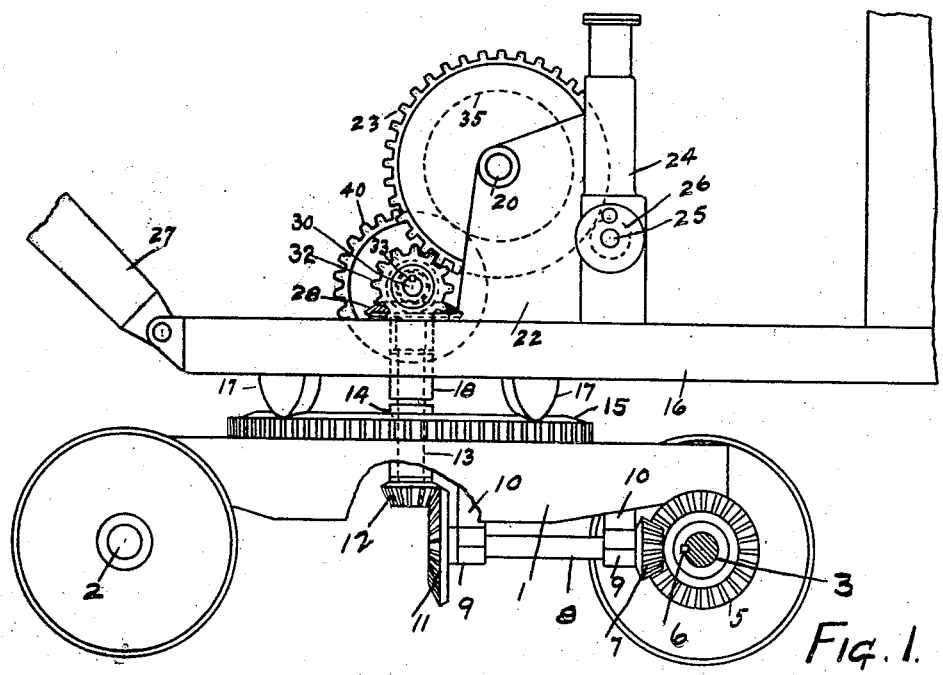

Figure 1 shows a side elevation of the machine.

Figure 2:
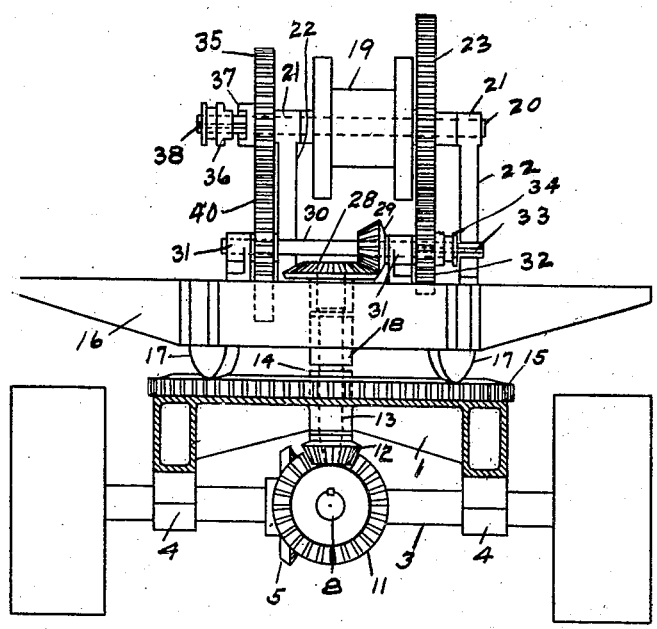

Fig. 2 a front elevation, partly in section.

1 marks the frame of the machine, 2 the front axle, 3 the rear axle, 4 bearings for the rear axle, 5 a gear fixed on the rear axle by means of a key 6, 7 a pinion meshing the gear 5, 8 a shaft on which the gear 7 is mounted, 9 bearings for the shaft 8, 10 brackets carrying the bearings 9, 11 a beveled gear on the shaft 8 meshing a gear 12 on the lower end of the center pin 13, 14 a bearing in the frame for the center pin, 15 a circular track on which the swinging platform rides, 16 the swinging platform and 17 wheels carrying the swinging platform, and 18 a bearing in the swinging platform for the center pin 13. These parts may be of ordinary construction.

The hoisting drum 19 is carried by a drum shaft 20. The drum shaft 20 is journaled in the bearings 21 carried by the posts or frame 22 extending upwardly from the swinging platform. The driving gear 23 is mounted on the shaft 20. This is driven from the engine 24, the crank 25 being provided with a gear 26 shown in dotted lines in Fig. 1. The drum is provided with the usual actuating mechanism (not shown), the drum being driven, however, through the gear 23. The platform is provided with the usual boom 27.

A beveled gear 28 is mounted on the upper end of the pin 13. A gear 29 meshes the gear 28. The gear 29 is intermediately located on a cross shaft 30. The cross shaft 30 is carried by the bearings 31 on the platform 16. A gear 32 is slidingly mounted on the cross shaft 30 and is locked against rotation thereon by means of the spline 33. The gear can, therefore, be moved axially on the shaft 30, a groove collar 34 being provided for this purpose. The gear may, therefore, be thrown into or out of mesh with the drum gear 23.

A gear 35 is arranged on the drum shaft 20 at the opposite side of the drum from the gear 23. A clutch made up of the detent elements 36 and 37 is provided for locking the gear 35 with the shaft 20. The element 36 of the clutch has a groove collar by means of which it may be thrown into or out of engagement with the other element, it being locked against rotation on the shaft by the spline 38. The gear 35 meshes a gear 40 fixed on the shaft 30. The gear 40 is of a different diameter from the gear 32 and as arranged it is larger than the gear 32 and the gear 35 is smaller than the gear 23. The gear ratio, therefore, through the gears 35 and 40 give a much slower rotation to the shaft 30 than the connection through the gears 23 and 32.

In operation if a high speed is desired, the clutch having the elements 36, 37 is thrown out and the gear 32 moved into mesh with the gear 23. If a slow speed is desired, the gear 32 is moved out of mesh and the clutch element 36 thrown into engagement. In this way a very convenient and durable mounting for the gears is provided, and the connection with the drum shaft conveniently arranged and at the same time the mechanism takes very little room over that required with relation to the hoisting drum and thus permits of its mounting on the swinging platform. This is desirable as the machine is operated from this platform.

What I claim as new is:—

1. In a machine of the class described, the combination of a traction wheel; a frame mounted on the traction wheel; a swinging platform on the frame; a center pin; a driving connection between the center pin and the traction wheel; a gear mounted on the upper end of the pin; a cross shaft extending over the pin; an intermediately located gear on the cross shaft meshing the gear on the pin; cross shaft gears on said cross shaft each side of the intermediately located gear, said cross shaft gears being of different diameters; a hoisting drum; a hoisting drum shaft on which the hoisting drum is mounted; gears on the hoisting drum shaft at each end of the hoisting drum meshing the cross shaft gears; and means for breaking or locking the driving connection between the drum shaft and the cross shaft at either end.

2. In a machine of the class described, the combination of a traction wheel; a frame mounted on the traction wheel; a swinging platform on the frame; a center pin; a driving connection between the center pin and the traction wheel; a gear mounted on the upper end of the pin; a cross shaft extending over the pin; an intermediately located gear on the cross shaft meshing the gear on the pin; cross shaft gears on said cross shaft each side of the intermediately located gear, said cross shaft gears being of different diameters; a hoisting drum; a hoisting drum shaft on which the hoisting drum is mounted; gears on the hoisting drum shaft at each end of the hoisting drum meshing the cross shaft gears; and means for breaking or locking the driving connection between the drum shaft and the cross shaft at either end, comprising a clutch between the drum shaft and one of the gears thereon; and a sliding mounting for the opposite cross shaft gear.

In testimony whereof I have hereunto set my hand.

CLARENCE B. WESTON.

Copies of this patent may be obtained for five cents each, by addressing the "Commissioner of Patents, Washington, D. C."